United States Patent
Bae et al.

(10) Patent No.: US 10,626,484 B2
(45) Date of Patent: Apr. 21, 2020

(54) OXYGEN ATOM-DISPERSED METAL MATRIX COMPOSITE AND METHOD OF MANUFACTURING THE SAME

(75) Inventors: Dong Hyun Bae, Seoul (KR); Jae Hyuck Shin, Seoul (KR); HyunJoo Choi, Seoul (KR); Hun Kang, Daejeon (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 981 days.

(21) Appl. No.: 14/129,359

(22) PCT Filed: Jun. 26, 2012

(86) PCT No.: PCT/KR2012/005030
§ 371 (c)(1),
(2), (4) Date: Dec. 26, 2013

(87) PCT Pub. No.: WO2013/002532
PCT Pub. Date: Jan. 3, 2013

(65) Prior Publication Data
US 2014/0127069 A1    May 8, 2014

(30) Foreign Application Priority Data
Jun. 27, 2011    (KR) .............. 10-2011-62047

(51) Int. Cl.
| | | |
|---|---|---|
| *B29B 13/02* | (2006.01) | |
| *C22C 32/00* | (2006.01) | |
| *B22F 1/00* | (2006.01) | |
| *C22C 1/10* | (2006.01) | |

(52) U.S. Cl.
CPC ............. *C22C 32/001* (2013.01); *B22F 1/00* (2013.01); *B29B 13/02* (2013.01); *C22C 1/1036* (2013.01);
(Continued)

(58) Field of Classification Search
CPC .................................................. B22D 11/108
See application file for complete search history.

(56) References Cited

U.S. PATENT DOCUMENTS

| | | | | |
|---|---|---|---|---|
| 6,284,014 | B1* | 9/2001 | Carden | .................. A61L 27/04 |
| | | | | 257/E23.112 |
| 2009/0266506 | A1* | 10/2009 | Naveau | ................ B22D 11/108 |
| | | | | 164/488 |
| 2010/0015003 | A1* | 1/2010 | Adam | ....................... B22F 9/20 |
| | | | | 420/418 |

FOREIGN PATENT DOCUMENTS

| | | |
|---|---|---|
| JP | 03-264603 | 11/1991 |
| KR | 10-2002-0080091 | 10/2002 |
| KR | 10-2010-0010181 | 2/2010 |

OTHER PUBLICATIONS

Reddy, "Stir Casting Process on Porosity Development and Micromechanical Properties of AA5050/Titanium Oxide Metal Matrix Composites", Jun. 2006, 5th National Conference on Materials and Manufacturing Processes, pp. 144-148. (Year: 2006).*

(Continued)

*Primary Examiner* — Humera N Sheikh
*Assistant Examiner* — Xiaobei Wang

(57) ABSTRACT

Disclosed is a method of manufacturing a metal matrix composite in which oxide nanoparticles are dispersed. Metal matrix composite powders in which oxide nanoparticles are dispersed are prepared. Gibbs free energy of the oxide nanoparticles is greater than that of an oxide of a metal matrix. A bulk processed material is manufactured from the composite powders through hot forming or a cast material is manufactured by inputting the composite powder into a molten base metal and then rapidly stirring a resultant mixture. The bulk processed material or the cast material is heat-treated so that atoms of the metal matrix and atoms of the oxide nanoparticles mutually diffuse. Oxygen atoms (Continued)

originating from the oxide nanoparticles are diffused and dispersed in the metal matrix.

9 Claims, 14 Drawing Sheets

(52) U.S. Cl.
CPC ........ *C22C 1/1084* (2013.01); *B22F 2998/00* (2013.01); *C22C 32/0021* (2013.01); *C22C 32/0026* (2013.01); *C22C 32/0031* (2013.01); *C22C 32/0036* (2013.01)

(56) References Cited

OTHER PUBLICATIONS

Liu et al., "Recent development in the fabrication of metal matrix-particulate composites using powder metallurgy techniques", 1994, J. Mat. Sci., vol. 29, pp. 1999-2007. (Year: 1994).*

Levashov et al., "Improved Mechanical and Tribological Properties of Metal-Matrix Composites Dispersion-Strengthened by Nanoparticles", Dec. 29, 2009, Materials, vol. 3, pp. 97-109. (Year: 2009).*

Toru Noguchi et al., "Carbon Nanotube/Aluminium Composites with Uniform Dispersion" Materials Transactions, vol. 45, No. 2, pp. 602-604 (Published online: Jun. 24, 2005).

Hisao Yanagi et al., "Carbon Nanotube/Aluminum Composites as a Novel Field Electron Emitter" Japanese Journal of Applied Physics vol. 45, No. 25, pp. L650-L653 (published online Jun. 23, 2006)

Sie Chin Tjong, "Novel Nanoparticle-Reinforced Metal Matrix Composites with Enhanced Mechanical Properties" Advanced Engineering Materials, vol. 9, No. 8, pp. 639-652 (Article first published online: Jul. 16, 2007)

S.K. Chaudhury et al., "A new spray forming technique for the preparation of aluminium rutile (TiO2) ex situ particle composite" Journal of Materials Processing Technology vol. 145; p. 385-390 (Feb. 2004).

* cited by examiner

FIG. 14
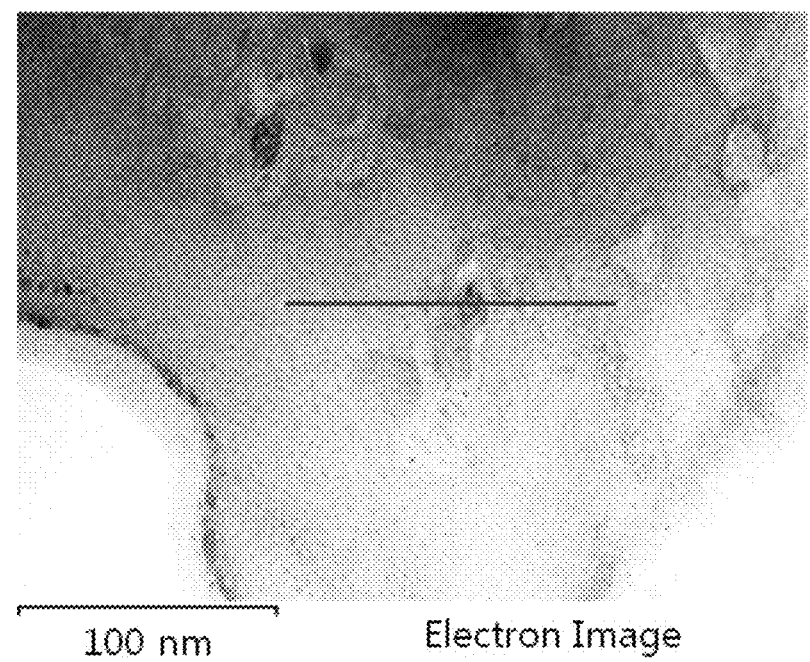
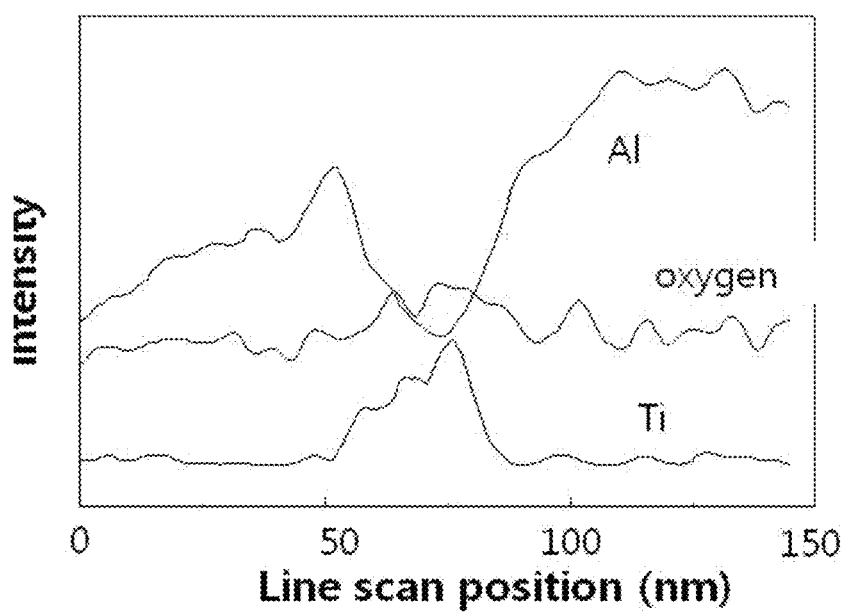

FIG. 15

| Matrix | ΔG° | Oxide | Complete reduction reaction |
|---|---|---|---|
| Al | | CuO | $3CuO + 2Al \rightarrow 3Cu + Al_2O_3$ |
| Al | | NiO | $3NiO + 2Al \rightarrow 3Ni + Al_2O_3$ |
| Al | | $Fe_2O_3$ | $Fe_2O_3 + 2Al \rightarrow 2Fe + Al_2O_3$ |
| Al | | ZnO | $3ZnO + 2Al \rightarrow 3Zn + Al_2O_3$ |
| Al | | $Cr_2O_3$ | $Cr_2O_3 + 2Al \rightarrow 2Cr + Al_2O_3$ |
| Al | | $MnO_2$ | $3MnO_2 + 4Al \rightarrow 3Mn + 2Al_2O_3$ |
| Al | | $SiO_2$ | $3SiO_2 + 4Al \rightarrow 3Si + 2Al_2O_3$ |
| Al | | $TiO_2$ | $3TiO_2 + 4Al \rightarrow 3Ti + 2Al_2O_3$ |
| Al | | $ZrO_2$ | $3ZrO_2 + 4Al \rightarrow 3Zr + 2Al_2O_3$ |
| | | $Al_2O_3$ | |

FIG. 16

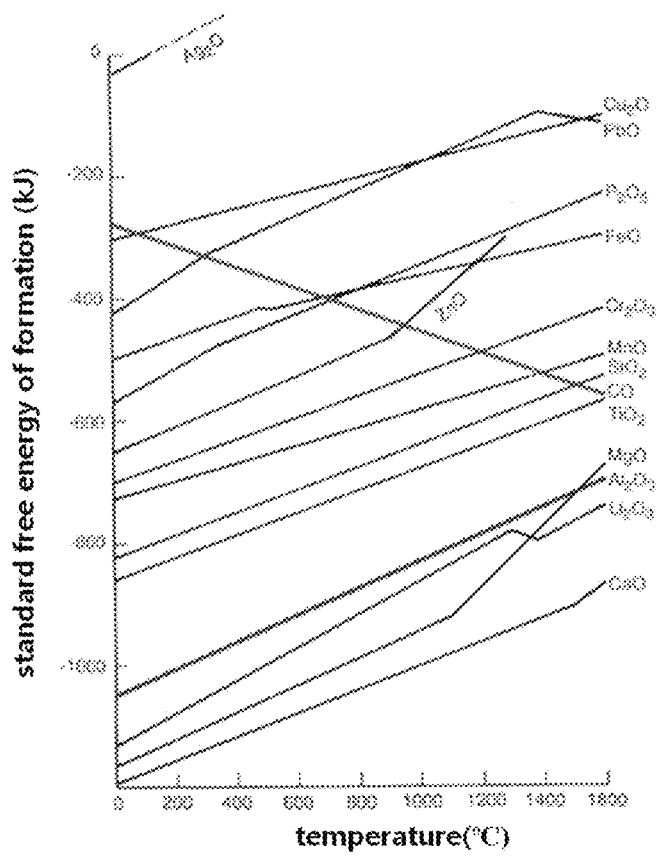

FIG. 23
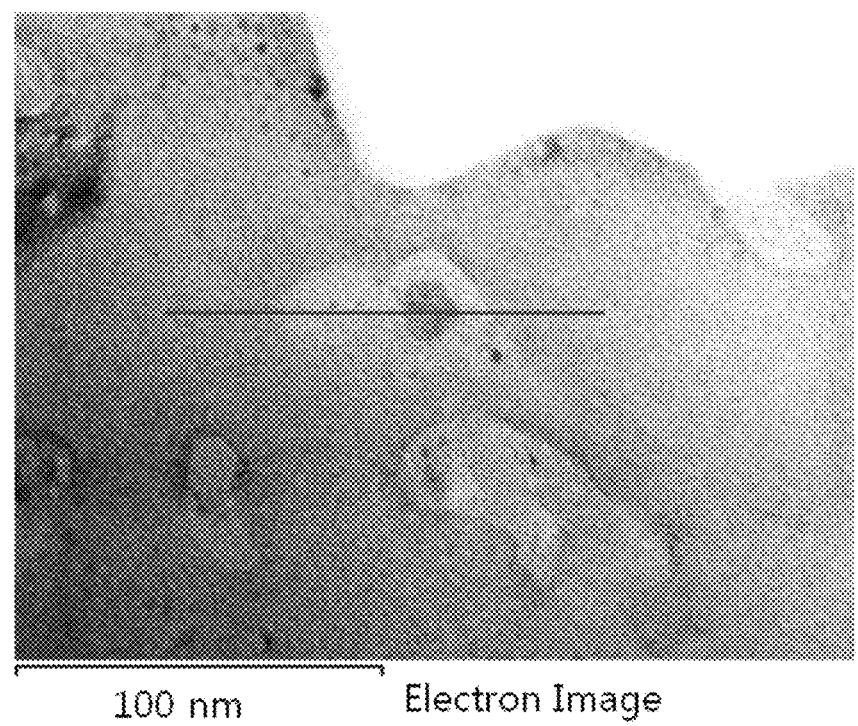
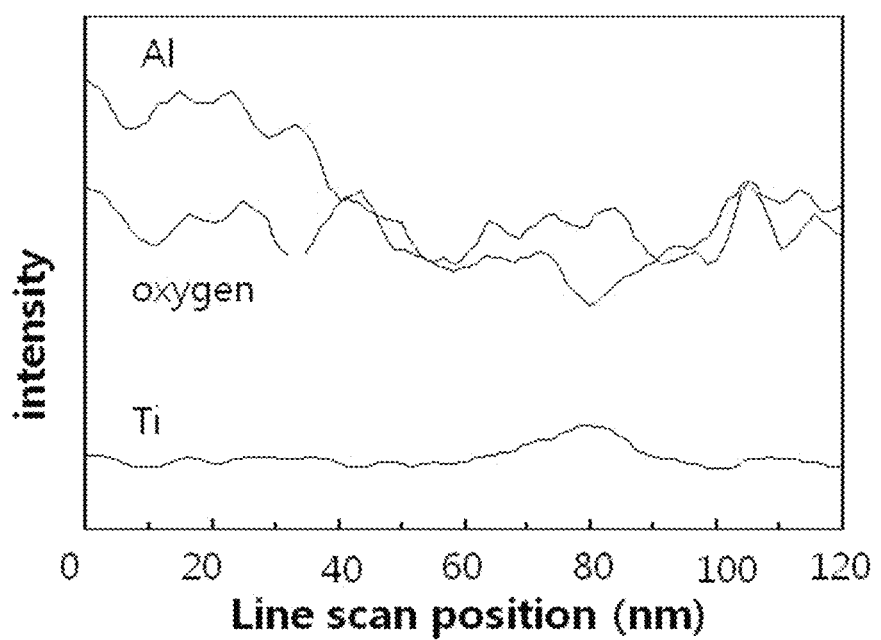

OXYGEN ATOM-DISPERSED METAL MATRIX COMPOSITE AND METHOD OF MANUFACTURING THE SAME

TECHNICAL FIELD

The present invention relates to a metal matrix composite and a method of manufacturing the same, and more particularly, to a metal matrix composite, of which mechanical properties and corrosion resistance are significantly improved by dispersing and/or diffusing oxide nanoparticles or oxygen atoms in a metal matrix, and a method of manufacturing the same.

BACKGROUND ART

Metal matrix composites exhibit superior mechanical properties over existing metal materials since the superior ductility of a metal matrix is combined with the high hardness, high elasticity and abrasion resistance of a reinforcing material. Therefore, the metal matrix composites are becoming more popular in the materials industry related to vehicles and aircraft.

Existing methods of manufacturing a metal matrix composite in which nanoparticles or nanofibers are dispersed can be divided into three methods, i.e. a liquid phase method (Noguchi T, Magario A, Fukazawa S, Mater Trans 2004; 45:602, Yanagi H, Kawai Y, Kita K, Japanese Journal of Applied Physics 2006: 45: L650-3), a solid phase method (Sie Chin Tjong, Advanced Engineering Materials, 9(8), 2007, pp. 639 to 652), and a spray forming method (S. K. Chaudhury, C. S. Sivaramakrishnan, S. C. Panigrahi, Journal of Materials Processing Technology 145 (2004) 385-390).

According to the solid phase method, it is difficult to uniformly disperse a reinforcing material in powders, but the reinforcing material is mixed on the surface of the powder. Consequently, a degree of the dispersion decreases and the characteristics of the composite deteriorate due to the segregation of the reinforcing material, for example, on the surface of the powder. In addition, since the reinforcing material present on the surface disturbs the bonding between powders when integrating the powders, it is difficult to manufacture a fine bulk material using this method. In addition, economic competitiveness caused by high manufacturing cost restricts the applicability of this method. Furthermore, the spray forming method is still at the research stage since some of powders may not be layered and controlling technologies for complex shapes and microstructures are required. This method is also restricted in terms of economic competitiveness due to high manufacturing cost.

The liquid phase method includes stir casting, squeeze casting, rheocasting, thixocasting, or the like. Among them, the stir casting is most popular in terms of simplicity, applicability, economic competiveness and productivity as a method of manufacturing a particle or discontinuous distribution-enhanced metal matrix composite.

However, in the stir casting method of the related art, simple mixing using the impeller and simple injection of a reinforcing material confront several problems to overcome, such as low wettability between the reinforcing material and the molten metal, the difference in the specific gravity between the molten metal and the reinforcing material, porous particles or nanofibers floating on a surface of the molten metal upon the casting, and the like. When a size of the reinforcing material decreases to a nanoscale, these problems become severe. Consequently, the manufacture of the composite becomes more difficult.

In the meantime, recently, interest on magnesium (Mg) is increasing as information technology (IT) devices are widely used. Mg is expected as a light-weight material in the transportation industry such as vehicles since the strength per unit weight of Mg is very high. However, Mg is vulnerable to corrosion, and when Mg is applied to cases of mobile phones or PCs or exterior parts of vehicles, surface treatment such as painting is required. Although the anodizing of Mg products is carried out by DOW17, HAE, or the like, the cost thereof is very high, so that several new surface treatment processes are being sought. However, a technology for fundamentally improving properties of the Mg material is still required.

DISCLOSURE

Technical Problem

The present invention has been made to solve the foregoing problems with the related art, and therefore an object of the present invention is to provide a method of manufacturing a metal matrix composite using a casting method, preferably, a stir-casting method which has superior industrial applicability since its manufacturing process is easier and simpler than powder processing, and a metal matrix composite manufactured thereby.

Another object of the present invention is to provide a metal matrix composite and a method of manufacturing the same, in which nanoparticles can be properly mixed with a molten matrix so as to be uniformly dispersed without segregation or agglomeration during casting.

A further object of the present invention is to provide a method of controlling surface characteristics between a metal matrix and heterogeneous nanoparticles through interfacial treatment on a base metal and nanoparticles.

Another object of the present invention is to provide a method capable of realizing superior mechanical properties through interfacial treatment on a base metal and nanoparticles.

A further object of the present invention is to provide a metal matrix composite and a method of manufacturing the same, in which a great amount of large bulk materials can be manufactured using a simple mechanical process, and the metal matrix composite has superior mechanical properties.

Another object of the present invention is to provide a metal matrix composite which has novel properties and a method of manufacturing the same by diffusing and/or dispersing oxygen atoms into a metal matrix by controlling diffusion during the interfacial reaction between oxide nanoparticles and the metal matrix.

A further object of the present invention is to provide a metal matrix composite and a method of manufacturing the same, in which properties, such as corrosion resistance, are significantly improved by forming a new interface layer between oxide nanoparticles and a metal matrix and enabling oxygen atoms originating from the interface layer to diffuse.

Technical Solution

According to an aspect of the present invention, provided is a method of manufacturing a metal matrix composite in which oxide nanoparticles are dispersed. The method includes the following steps of: preparing composite powders in which oxide nanoparticles are dispersed in metal matrix powders, Gibbs free energy of the oxide nanoparticles being greater than that of an oxide of a matrix metal; manufacturing a bulk processed material from the composite powders through hot forming or a cast material by inputting the composite powders into a molten base metal and then rapidly stirring a resultant mixture; and heat-treating the bulk processed material or the cast material so that atoms of the matrix metal and atoms of the oxide nanoparticles mutually diffuse, thereby allowing oxygen atoms originating from the oxide nanoparticles to diffuse and disperse into the metal matrix.

According to an embodiment, the oxide nanoparticles may have a size having a low energy barrier enabling the diffusion.

According to an embodiment, a size of the nanoparticles may be about 100 nm or less.

According to an embodiment, the heat-treating step may be carried out at a temperature ranging from 0.5 to 1 Tm (melting point of the metal matrix powders).

According to an embodiment, the metal matrix powders may be a pure metal selected from the group consisting of Al, Cu, Fe, Ti and Mg or a plastically-deformable alloy that contains a matrix of at least one selected from the group consisting of Al, Cu, Fe, Ti and Mg.

According to an embodiment, the oxide nanoparticles may be oxide nanoparticles made of one selected from the group consisting of titania ($TiO_2$), alumina ($Al_2O_3$), silica ($SiO_2$), zinc oxide ($ZnO_2$), zirconia ($ZrO_2$) and tin oxide ($SnO_2$).

According to the present invention, the oxygen atoms are diffused and dispersed in the metal matrix, so that a corrosion resistance of the composite is improved.

According to another embodiment of the present invention, provided is a method of manufacturing a metal matrix composite in which oxide nanoparticles are dispersed. The method includes the following steps of: preparing composite powders in which oxide nanoparticles are dispersed in metal matrix powders, Gibbs free energy of the oxide nanoparticles being greater than that of an oxide of a matrix metal; heat-treating the composite powders so that atoms of the matrix metal and atoms of the oxide nanoparticles mutually diffuse, thereby allowing oxygen atoms originating from the oxide nanoparticles to diffuse and disperse into the metal matrix; and manufacturing a bulk processed material from the composite powders through hot forming or a cast material by inputting the composite powders into a molten base metal and then stirring a resultant mixture.

According to another aspect of the present invention, provided is a metal matrix composite. The metal matrix composite includes a composite material in which oxide nanoparticles are dispersed in a metal matrix and a base metal. Gibbs free energy of the oxide nanoparticles is greater than that of an oxide of the matrix metal. The composite material has an interface layer between the nanoparticles and the metal matrix, such that the nanoparticles and the metal matrix are bonded to each other via the interface layer. Oxygen atoms originating from the oxide nanoparticles are dispersed in the metal matrix.

According to an embodiment, the metal matrix composite may be a cast material that is manufactured by inputting the composite material into a molten metal of the base metal and stirring a resultant mixture.

According to another embodiment of the present invention, provided is a metal matrix composite that includes a composite material in which oxide nanoparticles are dispersed in a metal matrix. Gibbs free energy of the oxide nanoparticles is greater than that of an oxide of the matrix metal. Oxygen atoms originating from the oxide nanoparticles are dispersed in the metal matrix of the composite material.

According to an embodiment, the metal matrix composite may be a bulk processed material manufactured by hot forming the composite material.

According to another embodiment of the present invention, provided is a magnesium (Mg) matrix composite in which oxide nanoparticles are dispersed in a Mg matrix. Gibbs free energy of the oxide nanoparticles is greater than that of a Mg oxide. Oxygen atoms originating from the oxide nanoparticles are dispersed in the Mg matrix.

According to an embodiment, the oxide nanoparticles may be $TiO_2$.

Advantageous Effects

According to the manufacturing method of the present invention, when a material in which oxide nanoparticles are uniformly dispersed is heat-treated at a preset temperature for a preset time, oxygen atoms in oxide nanoparticles are dispersed in a metal matrix by diffusing at the interface. When the oxygen atoms are diffused and dispersed in the metal matrix according to the present invention, corrosion resistance can be significantly improved. At the same time, it is possible to realize superior mechanical properties by easily controlling a degree of the dispersion.

DESCRIPTION OF DRAWINGS

FIG. 14 is a picture of an element gradient measured by line-scanning the surroundings of TiO$_2$ nanoparticles in an Al/TiO$_2$ material which is heat-treated at 500° C. for 24 hours in a manufacturing method according to a second embodiment of the invention;

FIG. 15 is a table showing reduction formulae between oxide nanoparticles and aluminum, in which the oxide nanoparticles are applicable to the manufacturing method according to the second embodiment of the invention, and the free energy of the oxide nanoparticles is greater than that of Al oxide particles (Al$_2$O$_3$);

FIG. 16 is a graph showing free energy levels of Al oxide particles (Al$_2$O$_3$) and other oxide particles depending on the temperature in the manufacturing method according to the second embodiment of the invention;

FIG. 23 is a picture of an element gradient measured by line-scanning the surroundings of TiO$_2$ nanoparticles of a cast material which is manufactured by immersing ball-milled Al/TiO$_2$ composite powders into molten Al and is heat-treated at 500° C. for 24 hours in the manufacturing method according to the second embodiment of the invention.

BEST MODE

Reference will now be made in detail to various embodiments of the present invention, examples of which are illustrated in the accompanying drawings and described below. In the following description of the present invention, detailed descriptions of known functions and components incorporated herein will be omitted. However, a person skilled in the art will be able to clearly comprehend the characteristic features and effects of the present invention in light of the following embodiments and realize the present invention with no special difficulties.

A. First Embodiment

Figure 1:
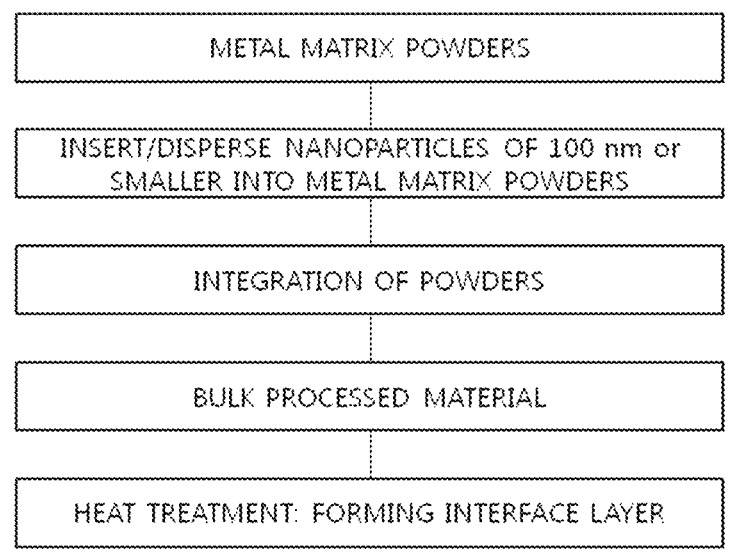
FIG. 1 is a schematic diagram showing a process of manufacturing a bulk processed material by integrating composite powder through hot forming in a manufacturing method according to one embodiment of the present invention.

1. Manufacture of Composite Powders in which Nanoparticles are Dispersed Using Mechanical Milling FIG. 1 is a flow diagram showing a process of manufacturing a metal matrix composite according to one embodiment of the present invention.

The inventors manufactured a composite according to the following process by selecting aluminum (Al) and titania (TiO$_2$, 20 nm) as a metal matrix and nanoparticles and then analyzed its characteristics.

As described later, it is preferred that the metal matrix material according to the present invention be a material that can be, in general, elastically and plastically deformed such that nanoparticles can be smoothly inserted therein. For example, it is preferred that the metal matrix material be a pure metal selected from among Al, Cu, Fe and Ti or a plastically-deformable alloy that contains a matrix of at least one selected from among Al, Cu, Fe and Ti. In the meantime, mechanical milling for dispersion of the nanoparticles into the metal matrix is illustrated. It should be understood, however, that the present invention is not limited thereto. Methods of dispersing nanoparticles in the metal matrix are not specifically limited so long as such methods can disperse nanoparticles in the metal matrix.

First, the inventors selected a method of physically inserting and dispersing nanoparticles into metal matrix powder through planetary ball milling. That is, TiO$_2$ was mixed to Al powders in a volume fraction of 10% inside a stainless vessel. Afterwards, a stainless ball having a diameter of 5 mm (about 750 g) corresponding to 15 times the weight of the mixed powders (about 50 g) was added to the vessel in which the mixed material was contained, and then physical energy, i.e. kinetic energy, was applied by rotating the vessel at a rate of 200 rpm for 3 hours. Here, the metal powders were prevented from oxidizing by maintaining the atmosphere inside the vessel using argon (Ar) gas, and a process control material was not added in order to prevent powder contamination and increase the cold-welding of the powders. After the process, the mixed powders were collected by separating the ball from the powders using a sieve.

Figure 3:
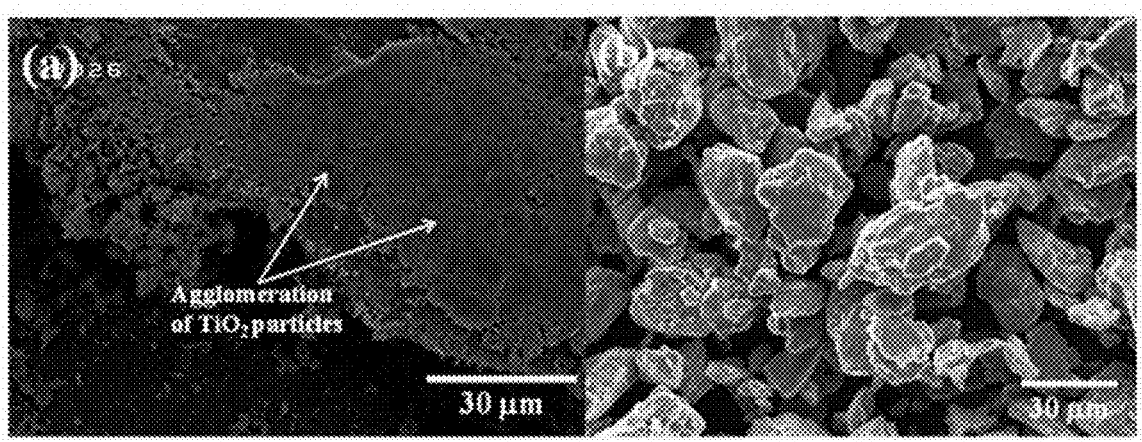
FIG. 3 is scanning electron microscopy (SEM) pictures showing the process in which titania ($TiO_2$) has been inserted and dispersed in aluminum (Al) powders during mechanical milling in the manufacturing method according to the present invention.

After the process, it was observed that $TiO_2$ nanoparticles were inserted in the Al powders, and the observed result is presented in FIG. 3. Specifically, in FIG. 3 (*a*), $TiO_2$ particles residing on the surface of the powders were observed since the milling time was not sufficient. When a sufficient amount of milling time was given (FIG. 3 (*b*)), it was observed that no $TiO_2$ particles were present on the surface since $TiO_2$ particles are completely inserted into the powder.

Specifically, according to one embodiment of the present invention, nanoparticles are gradually inserted and dispersed into the metal matrix powder through continuous plastic deformation, cold-welding and crushing of the metal matrix powders that can be plastically deformed by impact energy applied from the stainless ball under experimentally determined conditions.

In the meantime, according to one embodiment of the present invention, mechanical energy used in ball milling or hand milling may vary depending on the type and microscopic structure of the metal matrix, and be controlled depending on the type, size and weight of a milling medium, a milling rate, the size of a milling vessel, or the like.

2. Manufacture of Metal Matrix Composite by Integrating Composite Powders (1) Manufacture of Compact Product The inventors discovered that $TiO_2$ nanoparticles can be uniformly dispersed in a metal matrix through the above-mentioned process, and manufactured a final composite in a more simplified process using composite powders that were produced through the above-mentioned process.

That is, the inventors formed an intermediary product (compact product) by applying only a pressure to powders, or applying a pressure to the powders in a range of temperatures where the powders are not damaged, i.e. in a range of temperatures where the powders do not oxidize, and then manufactured a final bulk product by hot processing the intermediary product.

Figure 4:
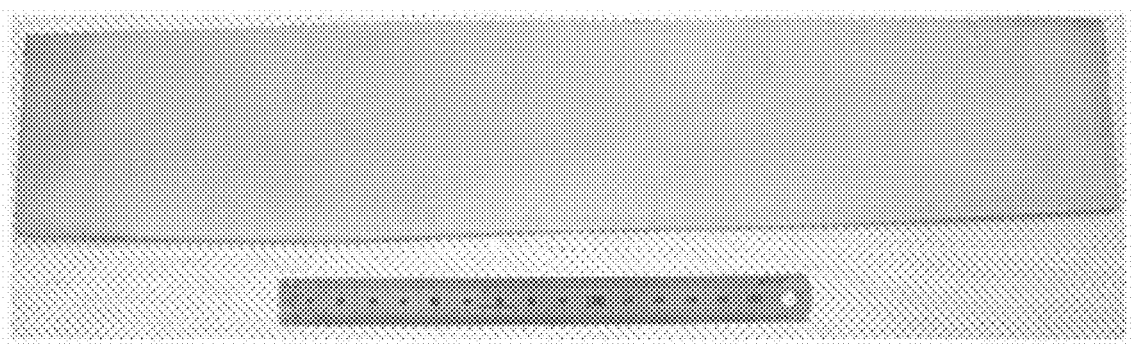
FIG. 4 is a picture of a plate produced by integrating composite powders through hot forming.

Specifically, the inventors adopted room-temperature pressing as a method of forming the intermediary product by applying a pressure to the Al—$TiO_2$ composite powders that were produced through the above-mentioned milling. The intermediary product was produced by charging the composite powders into a Cu tube and then applying a pressure of 500 MPa. The intermediary product produced through the above-mentioned process was hot rolled through hot working at 480° C. The rolling was carried out 27 times at a reduction ratio of 12%, and a thickness of the final plate was reduced by 97% from the thickness of the initial intermediary product. In addition to the hot rolling, a variety of hot forming processes, such as hot extrusion or hot pressing, which integrates the powders by applying heat and pressure thereto can be used. A plate produced through the above-mentioned process is shown in FIG. 4.

Figure 5:
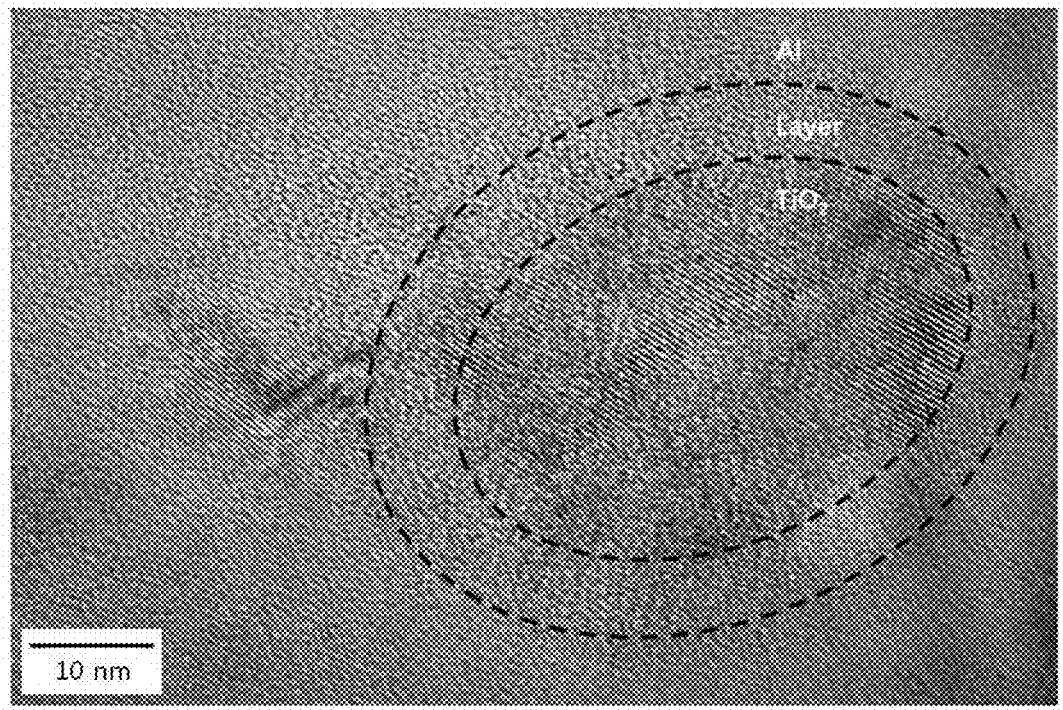
FIG. 5 is a transmission electron microscopy (TEM) picture showing a microscopic structure of a new interface layer produced by integrating composite powders through hot forming and then applying thermal energy to the resultant composite powders in the manufacturing method according to the present invention.
Figure 6:
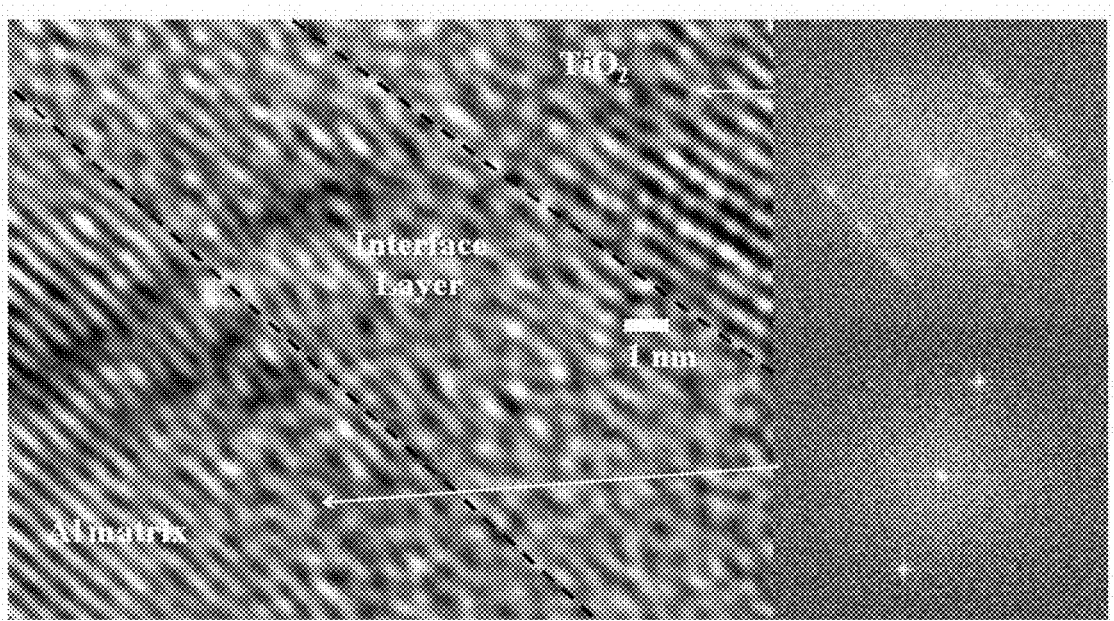
FIG. 6 is a TEM picture showing that a new layer is produced, through Al matrix and $TiO_2$ patterns, when thermal energy is applied to the composite powders in the manufacturing method according to the present invention.

(2) Manufacture of Metal Matrix Composite in which New Interface Layer is Formed Through Heat Treatment The inventors carried out heat treatment on the Al—$TiO_2$ composite that was produced through the above-mentioned process at about 500° C. (0.8 Tm, Tm: melting point of Al). Consequently, the inventors discovered that nanoparticles formed a new layer through diffusion at the interface between the nanoparticles and the metal matrix. Specifically, when the composite was heat-treated at 500° C. in a vacuum atmosphere for 5 hours, a new layer was unexpectedly found between the nanoparticles and the metal matrix. The result is presented in FIGS. 5 and 6. In particular, as shown in FIG. 6, the Al matrix pattern and the $TiO_2$ pattern show that a new area was formed therebetween. Specifically, it seems that $TiO_2$ nanoparticles were diffused at the interface between the Al metal matrix and $TiO_2$ nanoparticles, thereby forming a new layer that is different from $TiO_2$ or Al. As is well known in the art, free energy at the surface of particles increases with the size of particles decreasing. This can be explained based on chemical potential, which is expressed by the Gibbs-Thomson formula:

$$\mu(r)-\mu(\infty)=2K\Omega/r$$

In this formula, $\mu(r)$ and $\mu(\infty)$ indicate chemical potential values when the radius of particle is r and the surface is flat, K indicates surface free energy, and Q indicates the atomic volume. It can be appreciated that the chemical potential increases with the size of particle decreasing since the chemical potential is inversely proportional to the radius of particle. This means a state where the free energy level is very high.

Figure 7:
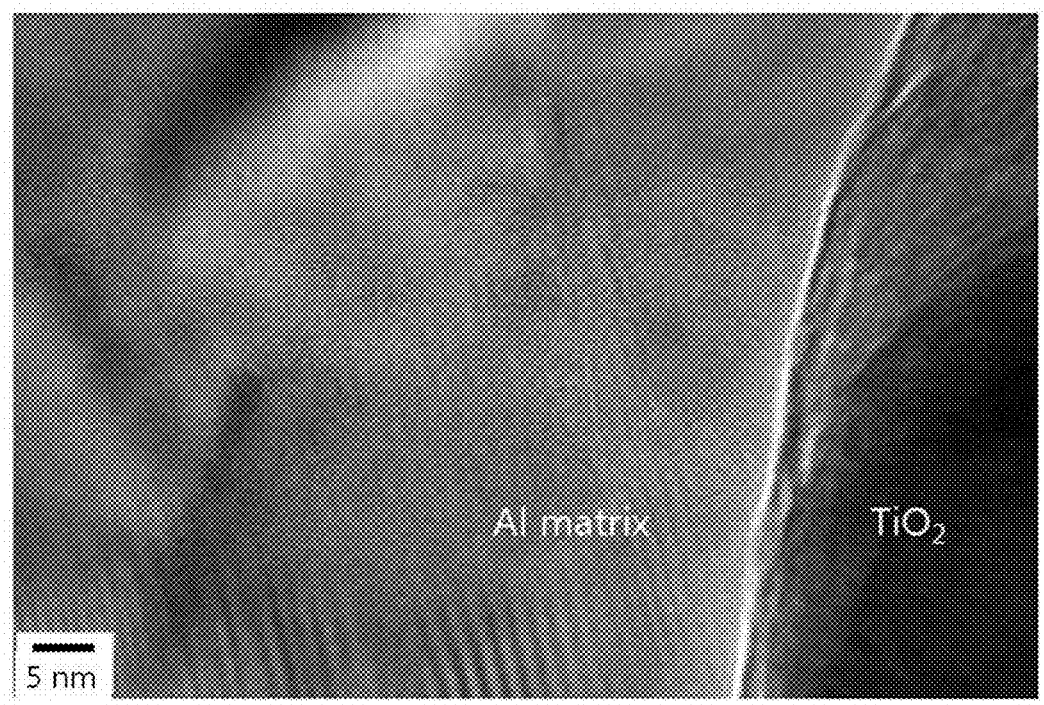
FIG. 7 is a TEM picture showing that an interface layer is not produced at the interface between an Al matrix and $TiO_2$ nanoparticles after a heat treatment process when a size of used $TiO_2$ nanoparticles is 300 nanometers in the manufacturing method according to the present invention.

When the size of nanoparticles is 100 nm or less, the energy barrier for diffusion is lowered significantly since the surface free energy is very high. In addition, since the Gibbs free energy of Al oxides is lower than that of $TiO_2$, it seems that atoms diffuse in a short range at the interface to form a new layer when a suitable amount of thermal energy is applied. In contrast, larger particles exceeding 100 nm did not diffuse at the interface since the energy barrier is not sufficiently lowered. This is shown in FIG. 7. The size of $TiO_2$ nanoparticles shown in FIG. 7 was about 300 nm, and the composite was manufactured in the same process as mentioned above. As can be appreciated from the picture of FIG. 7, the interface between Al and $TiO_2$ is clear, and no other new areas were observed. Therefore, with regard to the energy barrier, it is preferred that the manufacturing method according to the present invention use nanoparticles having the size of about 100 nm or less. In the meantime, when nanoparticles of 100 nm or less form an interface layer together with the metal matrix, stress is concentrated due to the difference in the coefficient of thermal expansion between the metal matrix and nanoparticles. As described later, it seems that when the material is applied with force, dislocations produced from the nanoparticles forming the interface propagate, which contributes to improvements on mechanical properties.

In the meantime, it is preferred that the heat treatment be carried out in a range of temperatures where $TiO_2$ nanoparticles can diffuse in a short range but do not produce an intermetallic compound, preferably, at a temperature ranging from 0.5 to 1 Tm (the melting point of the metal matrix). Below 0.5 Tm, a driving force sufficient for short range diffusion is not provided. Above 1 Tm, an intermetallic compound may be produced. Accordingly, it is preferred that the heat treatment be carried out in this range. In other words, it should be understood that the heat treatment carried out on the Al—$TiO_2$ composite at 500° C. for 5 hours is merely an illustrative heat treatment condition and the present invention is not limited to the heat treatment condition of this embodiment.

Although the new interface layer was formed by heat treating the bulk processed material in this embodiment, it is possible to manufacture a bulk processed material through the hot forming using the composite powders in which a new interface layer is formed between the nanoparticles and the metal matrix by carrying out heat treatment on the composite powders in which the nanoparticles are inserted into the metal matrix powders. This also falls within the scope of the present invention.

Figure 2:
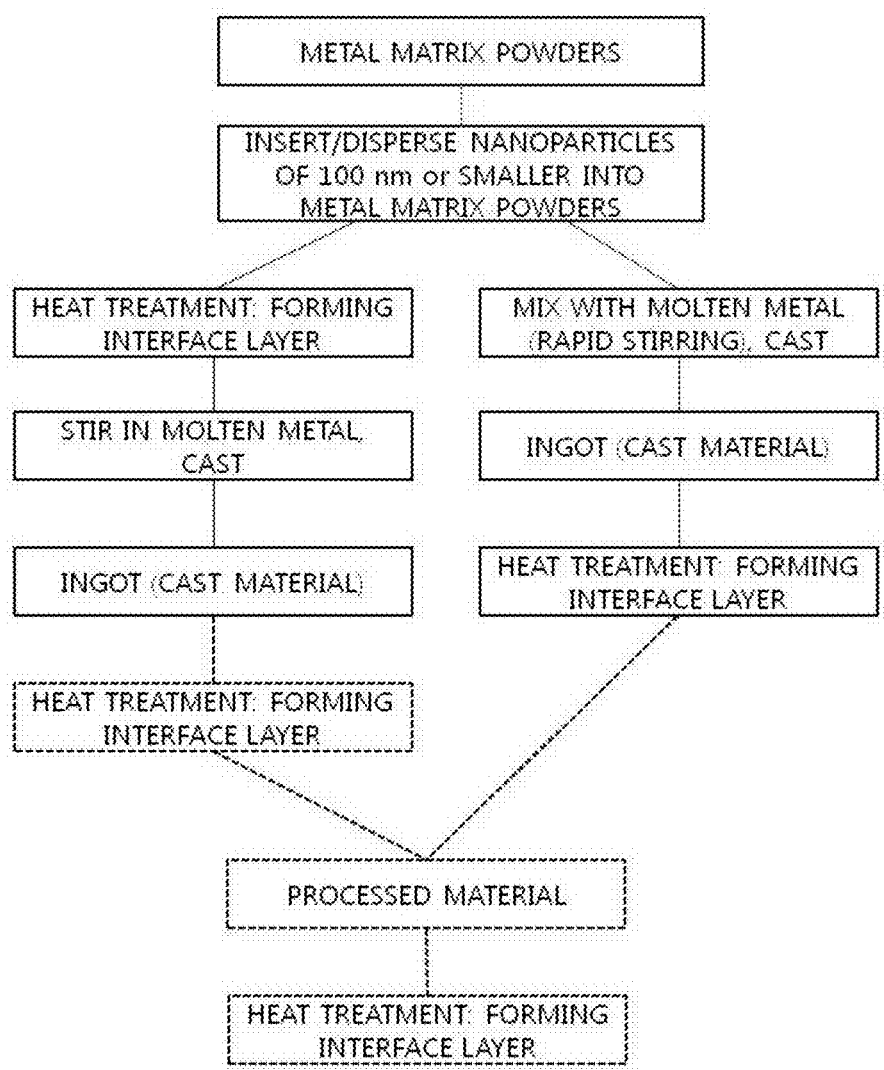
FIG. 2 is a schematic diagram showing another implementation of a casting process in the manufacturing method according to one embodiment of the present invention.

3. Manufacture of Metal Matrix Composite (Cast Material) in which Nanoparticles are Dispersed FIG. 2 shows a process of manufacturing a metal matrix composite according to another embodiment of the present invention. Unlike the embodiment shown in FIG. 1, this embodiment relates to the manufacture of the composite through casting, and can be divided into two aspects.

(1) Manufacture of Metal Matrix Composite Through Casting after Formation of New Layer in Composite Powders The inventors applied the method of forming a new layer that was described in relation to the former embodiment to casting, based on characteristics that appear due to the formation of the new layer. In other words, this embodiment relates to a method of manufacturing a metal matrix composite, and in particular, proposes a method of manufacturing a metal matrix composite by immersing composite powders in which a new layer is formed through heat treatment into a molten base metal.

The inventors mixed a solid phase method and a liquid phase method in order to overcome the problem of segregation and agglomeration of nanoparticles upon the melting in a liquid phase method, when manufacturing the metal matrix composite. That is, the Al—$TiO_2$ composite powders manufactured according to the former embodiment was heat-treated at 500° C. for 5 hours, thereby forming a new layer as in the process in which the heat treatment was carried out on the bulk material. The composite powders having the new layer were used in casting.

Specifically, the inventors melted an Al alloy base material (Al 5083) using an electric melting furnace, and then added the composite powders (Al/$TiO_2$) that was manufactured in the above-mentioned process by a volume ratio of 5% into the molten Al alloy. The composite powders were added at a temperature of about 750° C. where the base material was completely molten. The base material was stirred while the composite powders were being added. Here, as a stirring means, a turbine type impeller was used and the stirring rate was 500 rpm. The melting furnace and the stirring apparatus well-known in the art were used. The stirring rate can be experimentally determined in the range from 100 to 1000 rpm depending on the size of a metal matrix crucible, the viscosity of the molten metal and the shape of the impeller. The composite powders were added by maintaining the surroundings of the crucible in an Ar atmosphere, thereby preventing the composite powder and the molten metal from being oxidized. The temperature where the composite powders were added, i.e. the temperature where the casting was carried out, can vary depending on the type of a base metal. For example, the Al alloy has a semi-molten state zone, and the composite powers can be added in a range of temperatures corresponding to that zone.

As described above, in the composite powders, the nanoparticles are inserted into the powder through the mechanical milling and a new layer is formed between the metal matrix powders and the nanoparticles through the heat treatment. Consequently, when the composite powders are added to the molten metal, it is possible to delay direct contact between nanoparticles and the hot molten metal. The new layer causes nanoparticles to be strongly bonded with the base metal, thereby increasing wettability. Consequently, the nanoparticles can be uniformly dispersed in the molten metal without segregation or agglomeration during the following stir-casting.

Figure 8:
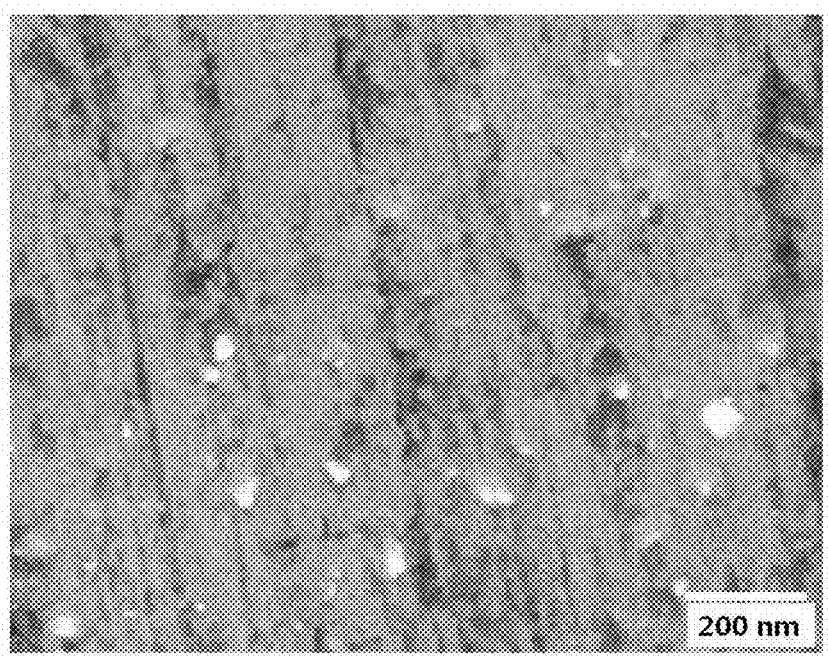
FIG. 8 is an SEM picture of a microscopic structure of a composite manufactured in the manufacturing method according to the invention by stirring and then casting an Al alloy (Al 5083) and composite powders (Al/$TiO_2$) in a molten state (750° C.), in which $TiO_2$ particles are uniformly dispersed in the Al alloy.
Figure 9:
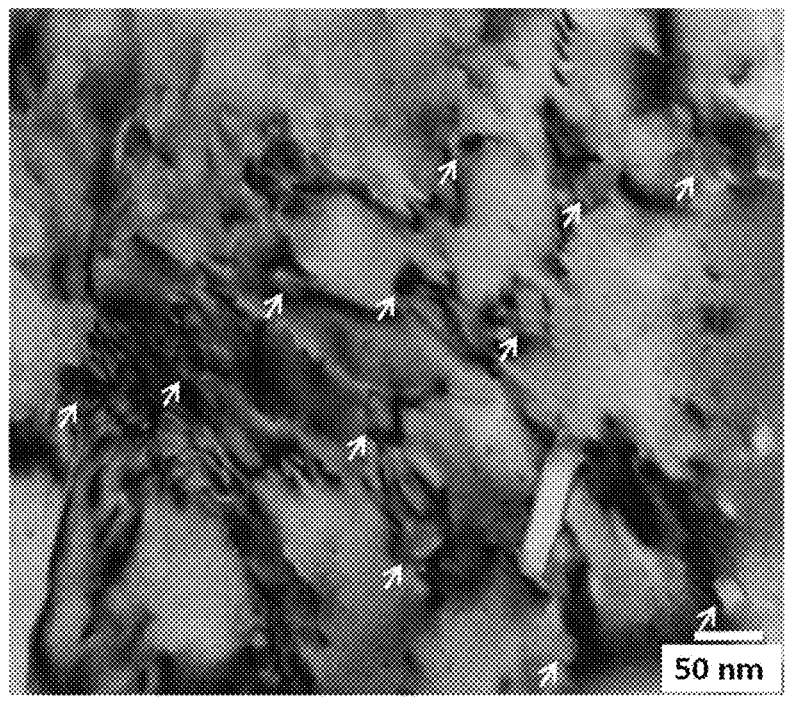
FIG. 9 is a TEM picture of a microscopic structure of a composite manufactured in the manufacturing method according to the invention by stirring and then casting an Al alloy (Al 5083) and composite powders (Al/TiO$_2$) in a molten state (750° C.), in which the composite is deformed by 5%, and in which TiO$_2$ nanoparticles are indicated with white arrows.
Figure 10:
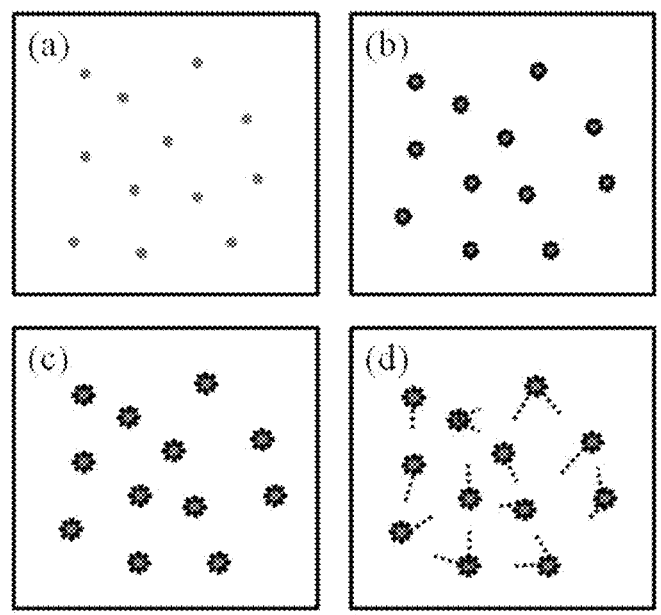
FIG. 10 is a diagram schematically showing a deformation behavior of a metal matrix composite manufactured in the manufacturing method according to the invention.

Specifically, FIG. 8 is a microscopy picture of the microscopic structure of a composite that was produced by stirring and then casting Al alloy (Al 5083) and composite powders (Al/$TiO_2$) in a molten state (750° C.) according to the above-described process. This picture shows that $TiO_2$ particles are uniformly dispersed in the Al alloy. In the meantime, FIG. 9 is a scanning electron microscopy (SEM) picture of the microscopic structure of a bulk cast material that was manufactured by the foregoing melting method and deformed by 5%. $TiO_2$ nanoparticles were indicated with white arrows. The propagation of dislocations produced in the layer between the nanoparticles and the base material can be observed. This acts as a factor that improves mechanical properties of the composite according to the present invention. Specifically, FIG. 10 is a diagram schematically showing a deformation behavior of the metal matrix composite manufactured in the method according to the present invention. As described above, according to the present invention, a new layer is formed between the nanoparticles and the metal matrix, stress is concentrated on this new layer to thereby produce dislocations, and the dislocations propagate from the new layer. Thus, the number of sources that can produce the dislocations is increased, and the dislocations propagate from the particles. It is therefore possible to improve deformability.

Figure 11:
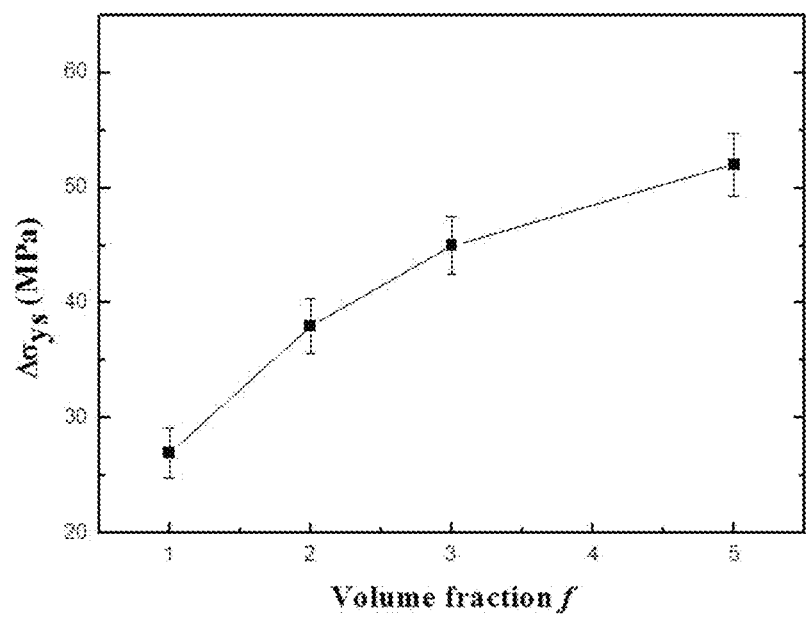
FIG. 11 is a graph showing hardness of a composite manufactured in the manufacturing method according to the invention by stirring and then casting an Al alloy (Al 5083) and composite powders (Al/TiO$_2$) in a molten state (750° C.) while increasing the fraction of nanoparticles from 1 to 5% by volume, in which the hardness of the composite is compared with the hardness of Al alloy (Al 5083) that is manufactured through simple casting.

FIG. 11 is a graph comparing the hardness of a bulk material that is manufactured in the above-mentioned melting method by increasing the fraction of nanoparticles from 1 to 5% by volume with the hardness of Al alloy (Al 5083) that is manufactured through simple casting. It can be appreciated that the hardness of the bulk material manufactured according to the present invention is greater than the hardness $\sigma_0$ of the Al alloy manufactured through simple casting (see y axis in FIG. 11). It can also be appreciated that the strength of the composite increases with the fraction of $TiO_2$ increasing.

Figure 12:
FIG. 12 is a picture of a plate manufactured in the manufacturing method according to the invention by manufacturing a composite by stirring and then casting an Al alloy (Al 5083) and composite powders (Al/TiO$_2$) in a molten state (750° C.), in which the fraction of nanoparticles is 3% by volume, and then milling the composite.

The inventors converted the composite in which the fraction of nanoparticles is 3% by volume from among the composites manufactured according to this embodiment into a plate through the hot rolling, the picture of which is shown in FIG. 12. This shows that the composite manufactured through the casting can be freely processed and applied through post processing such as rolling or extrusion. This means that the industrial applicability of the composite is very high.

In the meantime, although this embodiment was illustrated as forming the interface through the heat treatment only before casting, heat treatment for forming an additional interface layer can be selectively applied depending on characteristics required for a cast material or a processed material that is produced after casting, as shown in FIG. 2. This also falls within the scope of the present invention.

Figure 13:
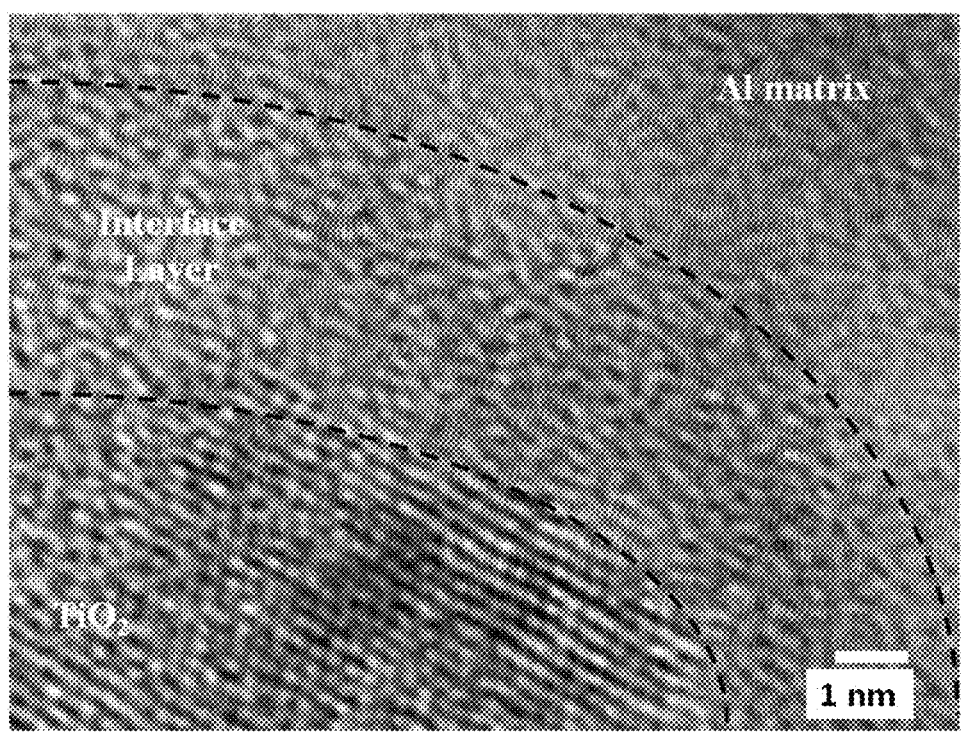
FIG. 13 is a TEM picture showing a new interface layer formed between a base metal and nanoparticles according to a modified embodiment of the invention, in which composite powders are added to a molten base metal, the resultant molten mixture is casted, and the resultant cast material is heat-treated at a high temperature.

(2) Manufacture of Metal Matrix Composite Through Formation of New Layer after Casting Using Composite Powders In the above embodiment, the new layer was formed by heat-treating the composite powders before the casting. With regard to this, the inventors input the composite powders that were produced through the above-mentioned process into the molten base metal without carrying out heat treatment on the composite powder, rapidly stirred the molten metal, and then cast the molten metal. Afterwards, heat treatment was carried out on the resultant composite. The heat treatment was carried out at a temperature of about 500° C. (from 0.5 to 1 Tm). Consequently, like the above embodiment, a new layer was observed between the metal matrix and the nanoparticles. This is shown in the electron microscopy picture of FIG. 13.

According to this embodiment, segregation or suspension may occur during the casting due to weak interfacing bonding force between the metal matrix and the nanoparticles since the composite powders in which the new layer was not formed was used in the casting process. Therefore, the casting was carried out through the rapid stirring. A rapid stirring apparatus is designed and fabricated such that a screw is mounted inside a graphite cylinder in order to maximize stirring force through the rotation of the screw during melting.

Also in this embodiment, the heat treatment for forming an additional layer can be selectively applied depending on characteristics required for a processed material that is produced by processing the heat-treated cast material, as in the former embodiment. This also falls within the scope of the present invention.

As set forth above, it was confirmed that a new layer can be formed between the metal matrix and the nanoparticles by heat-treating the composite powder according to the present invention or heat-treating a final cast composite at a temperature where the nanoparticles can be diffused. It is therefore possible to widen this technical principle into various forms.

B. Second Embodiment

As described above in the first embodiment, the mechanical properties were improved due to the new layer formed between the metal matrix and the oxide nanoparticles. The inventors carried out additional heat treatment on a composite that was manufactured in substantially the same process as in the first embodiment, and thus discovered a surprising result. This discovery forms an important technical principle of the present invention. Reference will now be made in detail to this embodiment.

1. Manufacture of Composite Powders in which Oxide Nanoparticles are Dispersed Using Mechanical Milling Also in this embodiment, composite powders were manufactured using substantially the same process as in the first embodiment. Specifically, the inventors selected a method of physically inserting and dispersing oxide nanoparticles into metal matrix powders through attrition ball milling. That is, $TiO_2$ was mixed to Al powders in a volume fraction of 3% inside a stainless vessel. Afterwards, a stainless ball having a diameter of 5 mm (about 1500 g) corresponding to 15 times the weight of the mixed powders (about 100 g) was added to the vessel in which the mixed material was contained. Then, the energy was applied by rotating the vessel at a rate of 500 rpm for 6 hours so that the materials inside the vessel can collide against each other. Descriptions of the other processes will be omitted since they are the same as those of the first embodiment.

2. Manufacture of Metal Matrix Composite by Integrating Composite Powders (1) Manufacture of Compact Product A compact product was formed by integrating the above-produced composite powders manufactured according to the same process as in the first embodiment. A final bulk material was manufactured through hot working of the compact product. Descriptions of the other technical components will be omitted since they are the same as those of the first embodiment.

(2) Manufacture of Metal Matrix Composite in which Oxygen Atoms are Diffused/Dispersed Through Heat Treatment Heat treatment was carried out on the Al—$TiO_2$ composite that was produced through the above-mentioned process at about 500° C. (0.8 Tm, Tm: melting point of Al). As a result, the nanoparticles diffused at the interface between the nanoparticles and the metal matrix and formed a new layer, as in the first embodiment. However, this embodiment differs from the first embodiment in that the heat treatment was carried out for 9 to 24 hours i.e. by increasing heat treatment time, in substantially the same conditions as in the first embodiment. Consequently, unexpected results were discovered. Unlike the first embodiment (heat treatment time: about 5 hours), as the heat treatment time increased, atoms of oxide nanoparticles and atoms of metal matrix diffuse into each other through the layer. Thus, oxygen atoms originating from the oxide nanoparticles diffused into the metal matrix, and the layer became too unclear to be referred to as a layer.

Specifically, the composite was heat-treated in a typical furnace at a temperature 500° C. for 9 to 24 hours. Surprisingly, it was found that the shape of oxide nanoparticles was changed such that atoms of oxide nanoparticles were separated. The atoms separated from the oxide nanoparticles diffused into Al matrix through mutual diffusion of atoms of the Al matrix. This consequently formed a diffused area between each oxide nanoparticle and the metal matrix, as shown in FIG. 14, instead of the clear layer of the first embodiment. As shown in FIG. 14, through line scanning carried out on the surroundings of oxide nanoparticles using STEM, it was confirmed that oxygen atoms diffused from around particles. That is, the clear new layer of the first embodiment almost disappeared, and it seems that the diffused area was formed through the mutual diffusion of atoms of oxide nanoparticles and atoms of the metal matrix through the layer. Here, the layer that is clearly distinguished from the oxide nanoparticles and the metal matrix disappeared. On the other hand, atoms of oxide nanoparticles and atoms of the metal matrix diffuse into each other, and atoms of oxide nanoparticles diffuse into the metal matrix, thereby forming an area. Herein, this area is referred to as the diffused area instead of the layer.

As described above in relation to the formation of the new layer in the first embodiment, free energy level at the surface of particles increases with the size of particles decreasing. Therefore, when the size of nanoparticles is 100 nm or less, the energy barrier for diffusion is lowered significantly since the surface free energy is very high. Since the Gibbs free energy of Al oxides is lower than that of $TiO_2$, a reduction reaction can be expected based on thermodynamics. On the assumption that this reduction reaction shall occur completely, the reaction can be expressed by the formula:

$$3TiO_2 + 4Al \rightarrow 3Ti + 2Al_2O_3$$

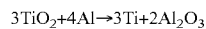

However, according to observation using a TEM, it was confirmed that this complete reaction did not occur. That is, the complete reduction reaction did not occur since thermal energy was not sufficient. It is considered that oxygen atoms were separated from $TiO_2$ and were dispersed into the Al matrix through short range diffusion through mutual diffusion with metal atoms of the Al matrix. In the case of the short range diffusion, when the size of particles is greater than 100 nm, the energy barrier is not sufficiently lowered. Thus, diffusion seems insufficient at the interface even if thermal energy is applied. Therefore, it is preferred that the manufacturing method according to the present invention use nanoparticles having the size of about 100 nm or less with regard to the energy barrier as in the first embodiment. Although $TiO_2$ nanoparticles were used in this embodiment, it is possible to use any oxide nanoparticles that can carry out a thermodynamic reduction reaction with Al, as shown in FIG. 15 and FIG. 16. That is, any oxide nanoparticles can be used as long as the Gibbs free energy thereof is greater than that of an Al oxide. All of these particles also fall within the scope of the present invention.

It is preferred that the heat treatment be carried out at a temperature where Al and $TiO_2$ nanoparticles can diffuse in a short range but do not produce an intermetallic compound, preferably, at temperature ranging from 0.5 to 1 Tm (the melting point of the metal matrix). Below 0.5 Tm, a driving force sufficient for short range diffusion is not provided. Above 1 Tm, an intermetallic compound may be produced. Accordingly, it is preferred that the heat treatment be carried out in this range. In other words, as in the first embodiment, it should be understood that heat treatment carried out on the Al—$TiO_2$ composite at 500° C. is merely an illustrative heat treatment condition and the present invention is not limited to the heat treatment condition of this embodiment.

3. Analysis of Properties of Metal Matrix Composite Depending on Degree of Diffusion of Oxygen Atoms The inventors tested mechanical properties of the Al matrix material manufactured as above, and the results are presented in FIG. 17 and FIG. 18.

Figure 17:
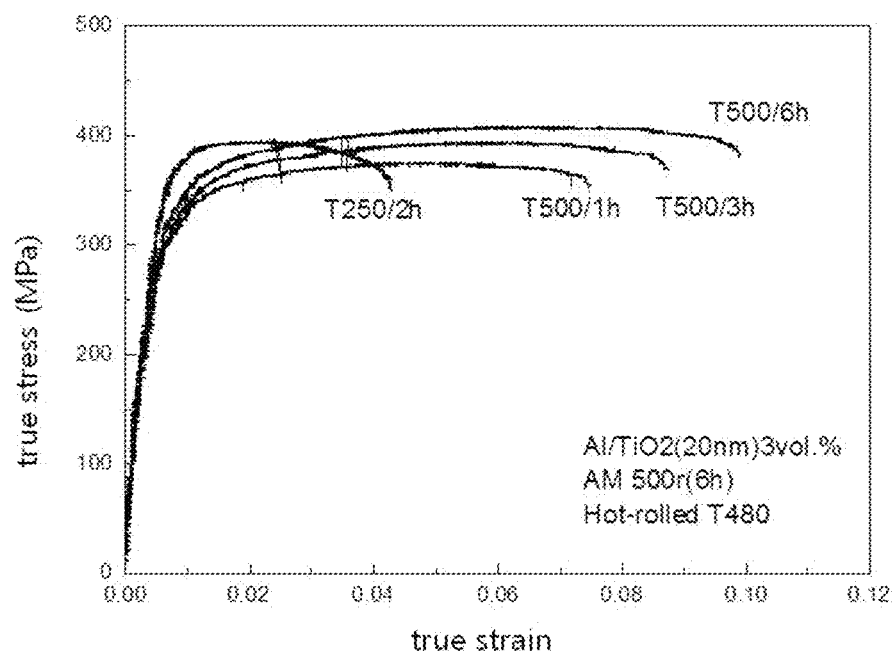
FIG. 17 is a graph showing mechanical properties of an Al matrix material according to the second embodiment of the invention, in which the mechanical properties vary depending on the time during heat treatment at 500° C.

FIG. 17 is a graph showing the result of tensile test carried out on a metal material manufactured in the above-mentioned process depending on the time when the metal material was left at 500° C. After a material was heat-treated 250° C. for first 2 hours, it can be appreciated that elongation is small due to weak bonding force since short range diffusion did not occur between the Al matrix and $TiO_2$ nanoparticles. In contrast, when the material was heat-treated at 500° C., the graph shows that short range diffusion occurred at the interface between the metal matrix and the oxide nanoparticles, thereby increasing bonding force and significantly increasing elongation. In addition, when the heat treatment time is increased to 6 hours, the foregoing phenomenon continued, thereby increasing both the strength and elongation.

Figure 18:
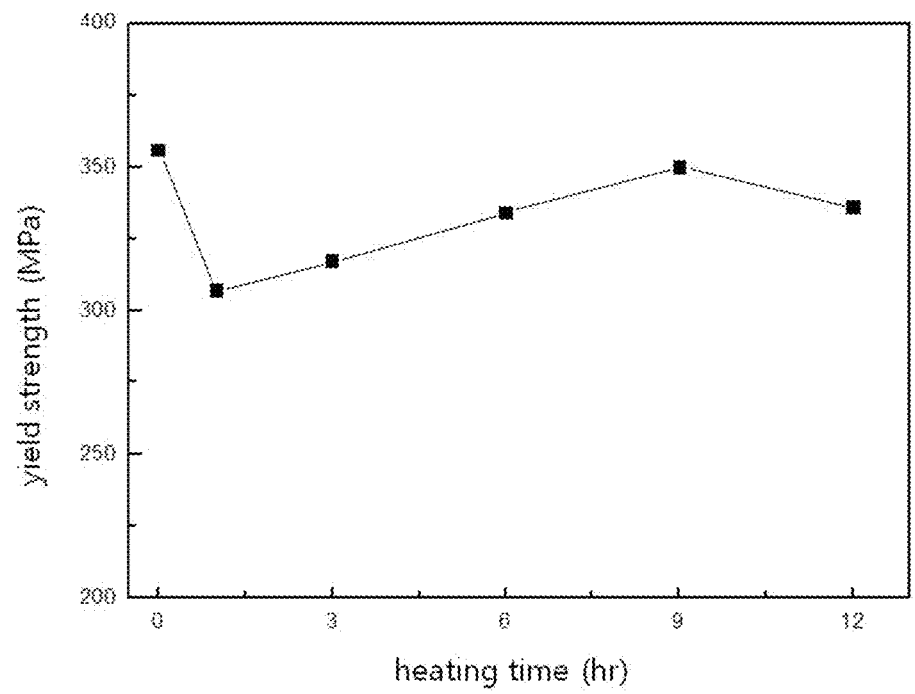
FIG. 18 is a graph showing the yield strength of the Al matrix material according to the second embodiment of the invention, in which the yield strength varies depending on the time during heat treatment at 500° C.

FIG. 18 is a graph showing the yield strength of the same metal material depending on the time. It can be appreciated that the yield strength gradually increases during heat treatment for 9 hours. Although the yield strength slightly decreases when heat treatment time exceeds hours, the material still exhibits superior mechanical properties.

Figure 19:
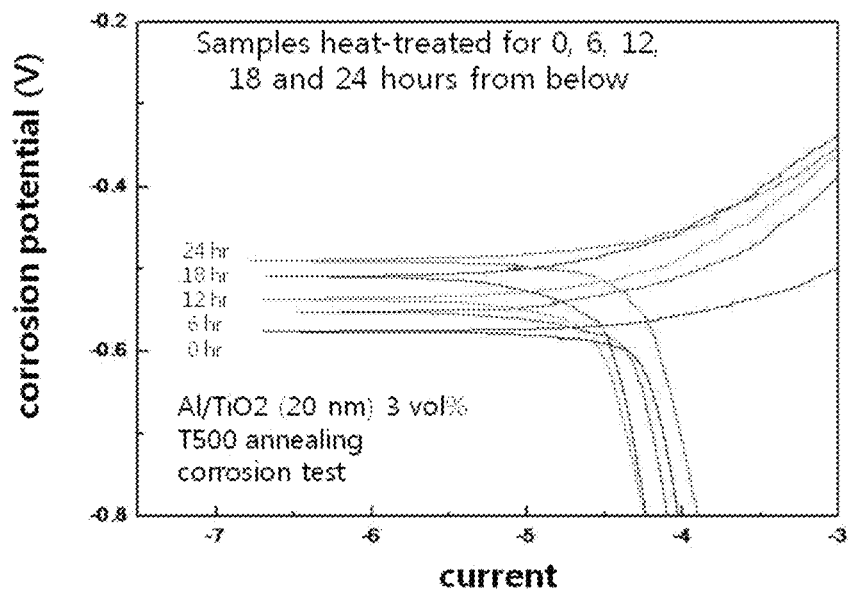
FIG. 19 is a graph showing the corrosion potential of the Al matrix material according to the second embodiment of the invention, in which the corrosion potential varies depending on the time during heat treatment at 500° C.
Figure 20:
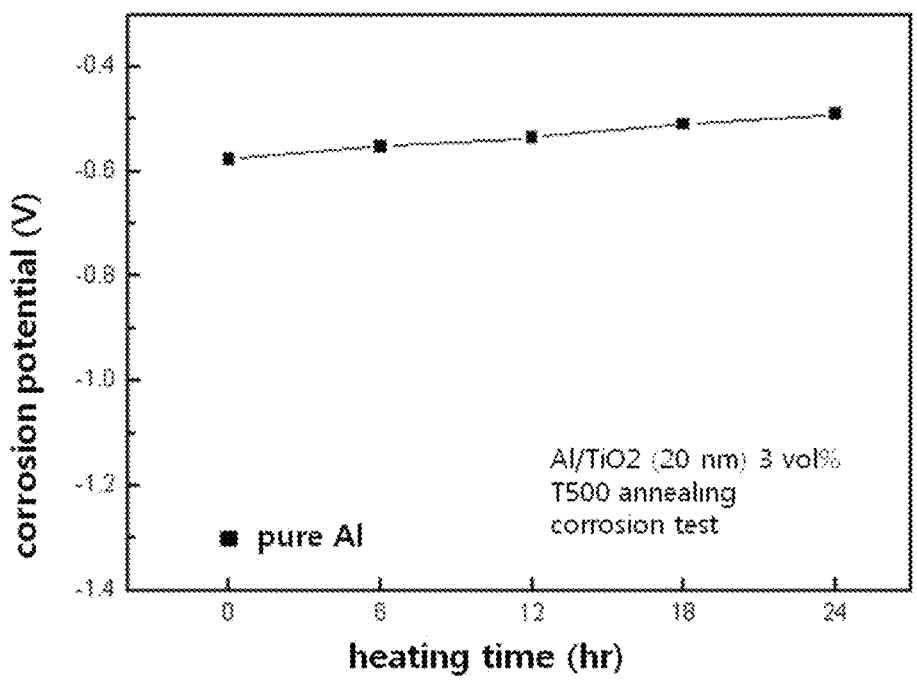
FIG. 20 is a graph showing the difference between the corrosion potential of the Al matrix material according to the second embodiment of the invention in which the corrosion potential varies depending on the time during heat treatment at 500° C. and the corrosion potential of pure aluminum.

In addition, the inventors tested corrosion resistance relating to the diffusion of oxygen atoms, in addition to the above-mentioned mechanical properties, and the results are presented in FIGS. 19 and 20. As apparent from FIG. 19 and FIG. 20, addition of 3% by volume of $TiO_2$ nanoparticles led to corrosion resistance that is significantly improved over those of pure Al. In addition, corrosion resistance was further improved as the oxygen atoms were diffused through the heat treatment.

In order to prove that the oxygen atoms can diffuse as described above and thus improve corrosion resistance or the like when the metal matrix is not the Al matrix, the inventors selected Mg that is vulnerable to corrosion as a metal matrix, manufactured a material according to the method of manufacturing a metal material as described above, and analyzed properties of the manufactured material. Since some process variables suitable for Mg were selected, the ball-milling rate, the power integration temperature, the heat treatment temperature and the like slightly differ from those of the process of manufacturing an Al material.

First, attrition ball milling was used as in the case of Al, and $TiO_2$ was mixed to Mg powders in a volume fraction of 5%. Afterwards, a stainless ball having a diameter of 5 mm (about 1500 g) corresponding to 15 times the weight of the mixed powder (about 100 g) was added to a vessel in which the mixed material was contained, and then energy was applied by rotating the vessel at a rate of 300 rpm for 6 hours so that materials inside the vessel can collide against each other. The other conditions are the same as those of the manufacture of the Al matrix composite according to the second embodiment. After the manufacture of the composite powder, the temperature of hot rolling was 400° C. in the integration process of the powders.

As apparent from FIG. 16, the Gibbs free energy of magnesium oxide (MgO) is lower than that of $TiO_2$, like aluminum oxide ($Al_2O_3$). Thus, when a suitable amount of thermal energy is applied, oxygen atoms can diffuse as atoms of the Mg matrix and atoms of $TiO_2$ nanoparticles diffuse into each other.

Figure 21:
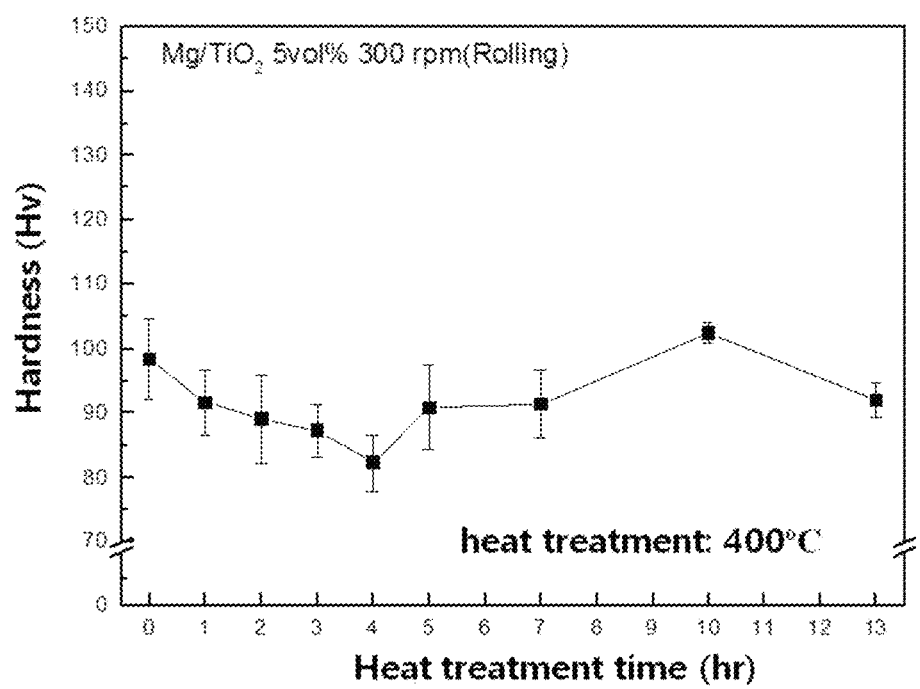
FIG. 21 is a graph showing the harness value of a magnesium (Mg) matrix material according to the second embodiment of the invention, in which the harness value varies depending on the time during heat treatment at 400° C.

The inventors tested mechanical properties of the Mg matrix composite manufactured as above, and the result is presented in FIG. 21.

FIG. 21 shows variations in the hardness of the composite that was manufactured in the above-described process, depending on the time when the composite was heat-treated at a temperature of 400° C. It is apparent that the hardness decreases for first 4 hours due to recovery, such as grain growth or residual stress relaxation. However, in the subsequent heat treatment, it can be observed that the hardness of the composite increases with the heat treatment time increasing.

Figure 22:
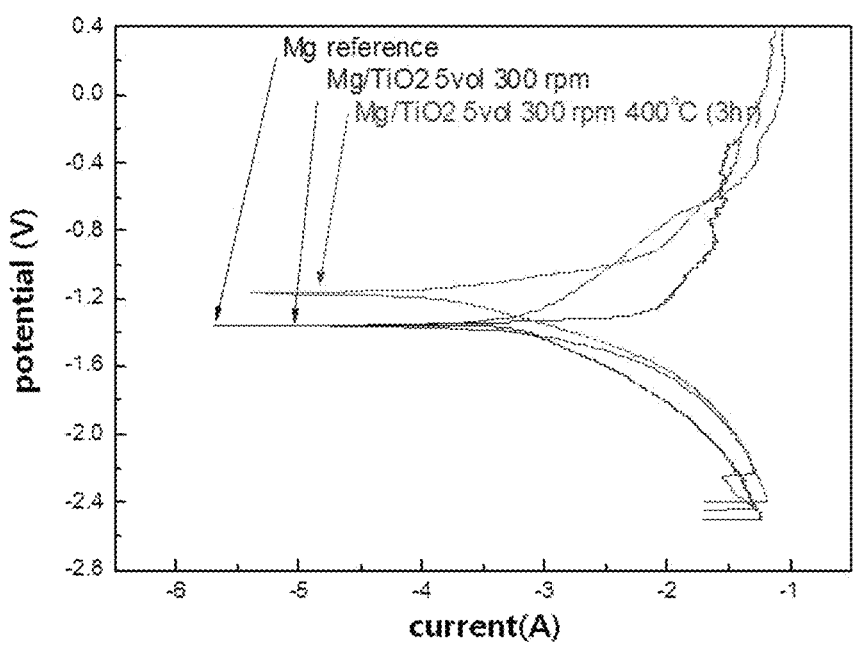
FIG. 22 is a graph showing the corrosion potential of the Mg matrix material according to the second embodiment of the invention, in which the corrosion potential varies depending on the time during heat treatment at 400° C.

In addition, the inventors tested the corrosion resistance of the Mg matrix composite, and the result is presented in FIG. 22. As apparent from FIG. 22, like the Al matrix composite, the corrosion resistance of the Mg matrix composite is significantly improved over those of pure Mg as the result of the heat treatment according to the present invention. Therefore, when the Mg matrix composite is manufactured according to the present invention, it is possible to improve the drawback of Mg, i.e. weak corrosion resistance. It is thus expected that the usability of Mg can be widened.

Although the metal material was manufactured by integrating the composite powders through hot forming in this embodiment, it is possible to diffuse and disperse oxygen atoms into a cast material or a processed material, which is manufactured by immersing composite powders into a molten metal matrix, followed by stirring, through heat treatment. This is also shown in FIG. 23.

In addition, as in the first embodiment, heat treatment can be carried out on the composite powders before the manufacture of the bulk processed material or the cast material, so that oxygen atoms can diffuse and disperse into the metal matrix by mutual diffusion of atoms. This also falls within the scope of the present invention.

Although the present invention has been described hereinabove with respect to the exemplary embodiments, it should be understood that the present invention is not limited to the foregoing embodiments. Although $TiO_2$ was described as an example in the foregoing embodiments, nanoparticles of other oxides, such as alumina ($Al_2O_3$), silica ($SiO_2$), zinc oxide ($ZnO_2$), zirconia ($ZrO_2$) and tin oxide ($SnO_2$), can also be applied to the present invention as long as the Gibbs free energy thereof is greater than that of the oxide of the metal matrix. When thermal energy is applied according to the present invention, these particles can also diffuse at the interface adjoining the metal matrix, thereby forming a new interface layer. Atoms of the metal matrix and atoms of the oxide nanoparticles can also mutually diffuse through the interface layer, so that oxygen atoms originating from the oxide nanoparticles can be diffused and dispersed in the metal matrix. It should be understood that the present invention can be variously altered and modified within the scope of the appended claims and all such alterations and modifications fall within the scope of the present invention. Therefore, the present invention shall be defined by only the claims and their equivalents.

The invention claimed is:

1. A method of manufacturing a metal matrix composite, the method comprising following steps of:
   preparing a metal matrix powder and oxide nanoparticles;
   forming a first composite powder by physically inserting and dispersing at least one oxide nanoparticle into the metal matrix powder through mechanical milling;
   forming a second composite powder by heat-treating the first composite powder to allow oxygen atoms of the at least one inserted and dispersed oxide nanoparticle to diffuse and disperse into the metal matrix powder, based on that Gibbs free energy of the oxide nanoparticles being greater than that of an oxide of the metal matrix powder in a temperature range from 0° C. to 1800° C.;
   wherein the second composite powder has at least one interface layer between the metal matrix powder and the oxide nanoparticle;
   adding from 1% to 5% by volume of the second composite powder into a molten metal; and
   rapidly stirring a resultant mixture of the second composite powder and the molten metal, so that the metal matrix powder in the second composite powder is melted into the molten metal, and then the oxide nanoparticles of the second composite powder are uniformly dispersed in the molten metal without segregation or agglomeration because of the interface layer of the second composite powder,
   wherein a size of the oxide nanoparticles is about 100 nm or less,
   wherein the heat-treating of the first composite powder is carried out at a temperature ranging from 325° C. to 660° C.,
   wherein the oxide nanoparticles are made of one selected from the group consisting of titania ($TiO_2$), silica ($SiO_2$), zinc oxide ($ZnO_2$), zirconia ($ZrO_2$) and tin oxide ($SnO_2$),
   wherein the metal matrix powder includes one of aluminum (Al), magnesium (Mg), Al alloy and Mg alloy.

2. The method according to claim 1, wherein the oxide nanoparticles have a size having a low energy barrier enabling the diffusion of the oxygen atoms.

3. The method according to claim 1, wherein the interface layer delays direct contact between the oxide nanoparticles and the molten metal, and causes the oxide nanoparticles to be strongly bonded with the molten metal, and
   wherein at least one of the step of adding the composite powders and the step of stirring a resultant mixture is performed in an Ar atmosphere.

4. The method according to claim 3, wherein the oxide nanoparticles have a size having a low energy barrier enabling the diffusion of the oxygen atoms.

5. The method according to claim 1, further comprising:
   manufacturing a cast material using the molten metal into which the metal matrix powder in the second composite powder is melted and the oxide nanoparticles of the second composite powder are uniformly dispersed.

6. The method according to claim 5, further comprising:
   heat-treating the cast material.

7. The method according to claim 1, wherein the interface layer delays direct contact between the oxide nanoparticles and the molten metal, and causes the oxide nanoparticles to be strongly bonded with the molten metal.

8. The method according to claim 1, wherein at least one of the step of adding the composite powders and the step of stirring a resultant mixture is performed in an Ar atmosphere.

9. A method of manufacturing a metal matrix composite, the method comprising following steps of:
   preparing a metal matrix powder and oxide nanoparticles;
   forming a first composite powder by physically inserting and dispersing at least one oxide nanoparticle into the metal matrix powder through mechanical milling;
   forming a second composite powder by heat-treating the first composite powder to allow oxygen atoms of the at least one inserted and dispersed oxide nanoparticle to diffuse and disperse into the metal matrix powder, based on that Gibbs free energy of the oxide nanoparticles being greater than that of an oxide of the metal matrix powder in a temperature range from 0° C. to 1800° C.;
   wherein the second composite powder has at least one interface layer between the metal matrix powder and the oxide nanoparticle;
   adding from 1% to 5% by volume of the second composite powder into a molten metal; and
   rapidly stirring a resultant mixture of the second composite powder and the molten metal, so that the metal matrix powder in the second composite powder is melted into the molten metal, and then the oxide nanoparticles of the second composite powder are uniformly dispersed in the molten metal without segregation or agglomeration because of the interface layer of the second composite powder;
   manufacturing a cast material using the molten metal into which the metal matrix powder in the second composite powder is melted and the oxide nanoparticles of the second composite powder are uniformly dispersed; and
   heat-treating the cast material,
   wherein a size of the oxide nanoparticles is about 100 nm or less,
   wherein the heat-treating of the first composite powder is carried out at a temperature ranging from 325° C. to 660° C.,
   wherein the oxide nanoparticles are made of one selected from the group consisting of titania ($TiO_2$), alumina ($Al_2O_3$), silica ($SiO_2$), zinc oxide ($ZnO_2$), zirconia ($ZrO_2$) and tin oxide ($SnO_2$),
   wherein the metal matrix powder includes one of aluminum (Al), magnesium (Mg), Al alloy and Mg alloy.

* * * * *